3,824,293
BISTHIOETHERS
George L. Brode, Somerville, N.J., assignor to Union Carbide Corporation, New York, N.Y.
No Drawing. Filed Nov. 7, 1972, Ser. No. 304,542
Int. Cl. C07c 147/06
U.S. Cl. 260—607 A          10 Claims

ABSTRACT OF THE DISCLOSURE

A new class of bisthioethers has been prepared by condensing an alkali metal salt of an hydroxyalkyl or hydroxyaryl mercaptan with reactive aromatic halogen compounds such as hexachlorobenzene, hexachlorobenzene-bisphenol adducts, multichlorinated polyphenyls, and dichlorodiphenyl sulfone. Similar bisthioethers can be prepared by substituting salts of amino or carbalkoxy mercaptans for the hydroxy mercaptan.

BACKGROUND OF THE INVENTION

This invention pertains to novel bisthioethers and more particularly to the products obtained by condensing an alkali metal salt of an hydroxyalkyl mercaptan or hydroxyaryl mercaptan with reactive aromatic halogen compounds. It also pertains to bisthioethers obtained by using salts of amino mercaptans or carbalkoxy mercaptans for the hydroxy mercaptans.

Despite the advances in condensation polymer chemistry, there has been a continuing need for the preparation of comonomer containing moieties which contribute to oxidative stability, enhanced dye receptivity, or flame retardancy when converted into resins by condensation with activated aromatic halides.

SUMMARY OF THE INVENTION

Thioether diols have now been developed which lend themselves to the preparation of polyesters with enhanced flame retardant properties, and enhanced dye receptivity, and which can also be used for curing epoxy resins and for imparting flame retardant properties to polyurethane foam compositions. These bisthioethers are represented by the formula:

wherein G is a divalent radical selected from the group consisting of (1) 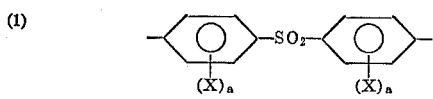

(2) 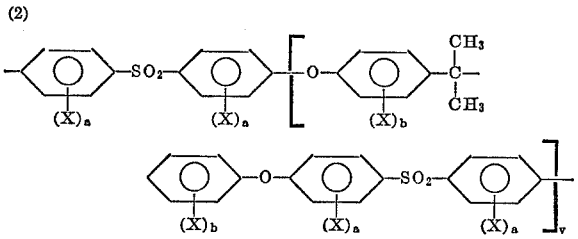

or

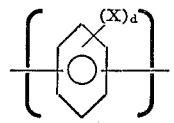

wherein

R is an alkylene radical having 1 to about 10 carbon atoms or an arylene radical having up to about 10 carbon atoms,
m and d are integers having values of 1 to 4,
a and b are each integers having values of 0 to 4 respectively,
v is a rational number having values of 1 to about 25, and
X is a halogen selected from the group consisting of chlorine, bromine and iodine.

In addition to the thioether diols two other bisthioethers can also be prepared, viz, thioether diamines and thioether diesters. A generic formula representing the three classes of bisthioethers is shown below:

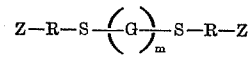

wherein R, G and m are as described above and Z is a monovalent radical selected from the group consisting of —OH, —NH$_2$ and —CO$_2$R' wherein R' is an alkyl group having up to about 18 carbon atoms.

DESCRIPTION OF THE INVENTION

The novel bisthioethers can be prepared by condensing an alkali metal salt of an hydroxyalkyl or hydroxyaryl mercaptan with a reactive aromatic halogen compound. An example of this preparation is the condensation of dichlorodiphenyl sulfone with the sodium salt of hydroxyethyl mercaptan. The equation for this reaction is shown below.

I

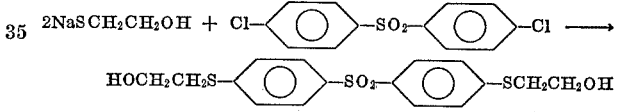

When chlorinated polyphenyls such as the Aroclors (trademark of commercially available polychlorinated polyphenols from Monsanto Chemical Company) are substituted for the dichlorodiphenyl sulfone, similar reaction products are obtained as shown by the equation below where a chlorinated terphenyl was used:

II

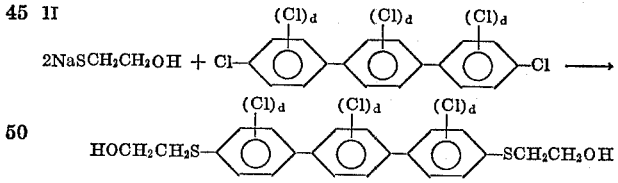

wherein d is an integer having values of 1 to 4.

When a mixture of dichlorodiphenyl sulfone and bisphenol-A (4,4-bis(p-hydroxyphenyl)propane is substituted for the dichlorodiphenyl sulfone alone used in equation I, an oligomeric diol is obtained as shown below:

III

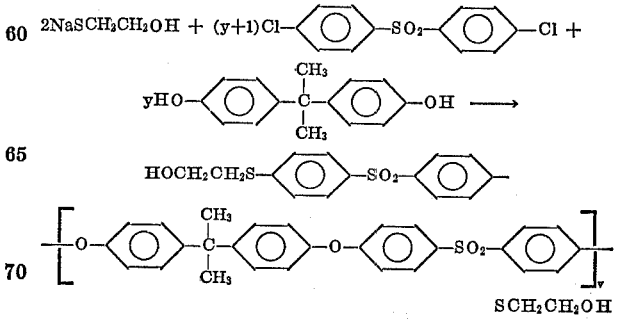

wherein $v$ is a rational number having values of about 1 to about 25, and $y$ is an integer and is at least 1.

In a similar manner thioether diamines can be prepared by condensing the potassium salt of beta-mercaptoethylamine with dichlorodiphenyl sulfone as shown below:

IV

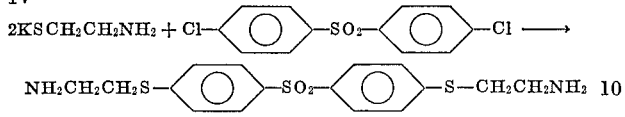

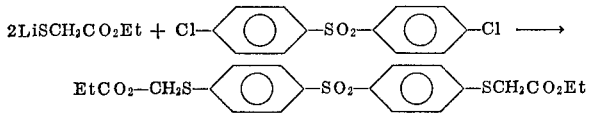

Thioether diesters can be prepared by condensing the lithium salt of beta-mercaptoethyl acetate with dichlorodiphenyl sulfone as shown below:

The thioether diamines can be used as curing agents for epoxy resins, as load building additives in polyurethane foam formulations and as intermediates for the synthesis of polyamides for conversion to fibers.

The thioether esters can be used as intermediates for the synthesis of polyesters and polyamides, to be employed in the fabrication of shaped articles.

The invention is further described in the Examples which follow. All parts and percentages are by weight unless otherwise specified.

EXAMPLE 1

Synthesis of Bis[4-(beta-hydroxyethylthio)phenylene]sulfone

To a 3 liter reaction flask equipped with a mechanical stirrer, a reflux condenser, nitrogen sparging tube, thermometer and addition funnel was charged 800 ml. of anhydrous ethanol and 227.3 grams (4.2 moles, that is, a 15 mole percent excess) of sodium methoxide. The resultant mixture was degassed by purging nitrogen through the system and applying a vacuum. The mixture was then heated to reflux and 342 grams (4.39 moles, that is, a 20 mole percent excess) of distilled hydroxyethyl mercaptain ($n_D^{25}=1.5013$) was added to the addition funnel. Heating the solution prevents precipitation of the sodium salt of beta-hydroxyethyl mercaptan. The mixture was then cooled to about 80° C. and 525.0 grams (1.83 moles) of dichlorodiphenyl sulfone was added through a powder funnel which had been substituted for the addition funnel. The mixture was heated for about 24 hours after which it was neutralized with dilute hydrochloric acid, filtered to remove sodium chloride and then allowed to crystallize from the solution. A yield of 80 to 90% of bis[4-(beta-hydroxyethylthio)phenylene] sulfone was obtained having a melting point of 124–126° C.

EXAMPLE 2

Oligomeric phenylene based thioether diol

Using the equipment and conditions described in Example 1, 228.3 grams (1.0 mole) of bisphenol A, 52.1 grams (0.66 mole) of hydroxyethyl mercaptan, 350 ml. of dimethyl sulfoxide and 800 ml. of chlorobenzene was charged to the reaction flask and degassed under a nitrogen stream. Thereafter, 196.4 grams (1.66 moles) of sodium hydroxide was added as a 50% aqueous solution and the water was then azeotropically removed by heating to 135–140° C. After removal of water, 382.9 grams (1.33 moles) of dichlorodiphenyl sulfone in 385 ml. of chlorobenzene was added at 140° C. and the temperature was gradually raised to 162–165° C. while allowing chlorobenzene to distill out of the reaction flask, the solution was heated overnight at 135° C. after which the mixture was diluted with 250 ml. of chlorobenzene, filtered and coagulated in methanol. The product represented by the formula below:

IV

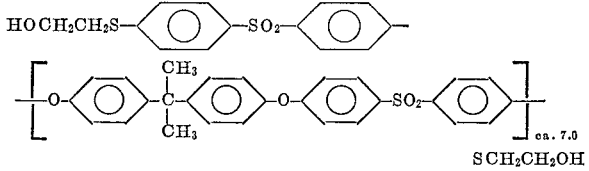

after drying in vacuo at 110° C. was an amorphous solid and was found by the acetic anhydride/pyridine/perchloric acid acetylation method to have an hydroxyl content of 0.62 milliequivalents per gram which represents a product having an average molecular weight of about 3220.

EXAMPLE 3

Oligomeric phenylene based thioether diol

Using the procedure described in Example 2 a solution of 58.61 grams (0.75 mole) of hydroxyethyl mercaptan in 82.0 grams of dimethyl sulfoxide was mixed with 40.52 grams (0.5 mole) of sodium methoxide in the reaction flask. Approximately 80% of the theoretical methanol was removed by heating the mixture at about 65° C. under a pressure of 45 millimeters of mercury and the resultant mixture was then added to a pre-reacted solution of chlorophenyl sulfone terminated oligomer prepared by the interaction of 342.4 grams (1.5 moles) of bisphenol A, 538.4 grams (1.875 moles) of dichlorophenyl sulfone and 236.9 grams (3.0 moles) of 50.7% sodium hydroxide in 400 ml. of dimethyl sulfoxide and 600 ml. of chlorobenzene. The water had been azeotropically removed prior to addition of the sodium salt of hydroxyethyl mercaptan. The resulting mixture was heated at 158–162° C. for 2 hours during which time the remaining chlorobenzene was distilled out. Thereafter the mixture was cooled to about 100° C. and the by-product sodium chloride removed by filtration. The clear solution was diluted with an additional quantity of dimethyl sulfoxide and coagulated in isopropanol. The product was filtered off, slurried in distilled water and dried in vacuo at 110–115° C. at a pressure of 30 inches of mercury. The resulting product, obtained in essentially quantitative yield had an hydroxyl equivalent of 0.883 milliequivalents per gram (theoretical of hydroxy equivalent is 0.935 milliequivalents per gram) equivalent to a molecular weight of 2286. The softening point of the amorphous solid product was 140–145° C. The nuclear magnetic resonance spectrum of this product was in agreement with the formula shown below:

V

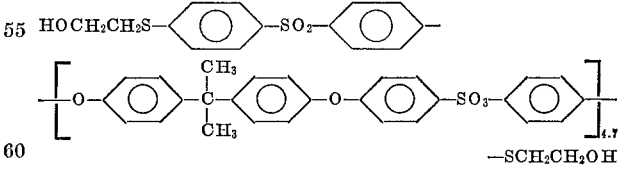

This product was used in conjunction with phthalic anhydride to effect the cure of a cycloaliphatic epoxide having the formula

VI

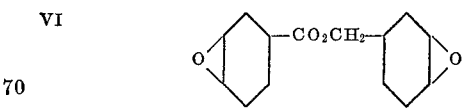

in a ratio of ½ mole of diol to 4 moles of phthalic anhydride to 4 moles of epoxy resin. The cured article was useful for molding shaped articles.

EXAMPLE 4

Oligomeric phenylene based thioether diol

Using the procedure described in Example 3 an oligomeric diol was prepared in quantitative yield having a molecular weight of approximately 4,500. The charge of reactants used was: 342.4 grams (1.5 moles) of bisphenol A, 478.8 grams (1.674 moles) of dichlorodiphenyl sulfone, 26.04 grams (0.33 moles) of hydroxyethyl mercaptan, 18.01 grams (0.33 moles) of sodium methoxide, 450 ml. of dimethyl sulfoxide and 600 ml. of chlorobenzene. The resultant product has the formula represented below:

VII

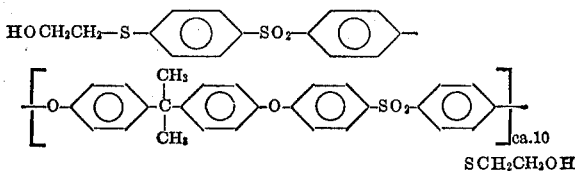

EXAMPLE 5

Polyester from bis[4-(beta-hydroxyethylthio)phenylene] sulfone and terephthaloyl chloride A 100 ml. round-bottom flask equipped with a Dean-Stark trap having a bottom take-off was charged with 10.0131 grams (0.0270 mole) of the bis[4-(beta-hydroxyethylthio)phenylene] sulfone prepared in Example 1 and 50 ml. of dichloroethane. The mixture was refluxed until the system was completely dehydrated by collecting 30 ml. of the original 50 ml. of dichloroethane in the Dean-Stark trap which was then removed. To the anhydrous system was added 5.7529 grams of triethylamine and 5.50 grams of recrystallized terephthaloyl chloride in 15 ml. of dichloroethane. The mixture was allowed to react for 4 hours at room temperature after which the mixture was coagulated in methanol. The product was then filtered off and dried affording a quantitative yield of polyester represented by the formula below:

VIII

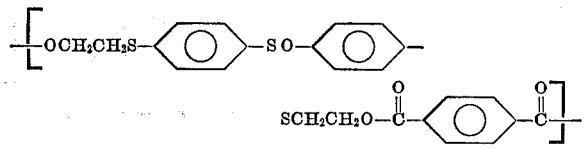

The reduced viscosity of this polyester as measured in chloroform at a concentration of 0.2% at 25° C. was found to be 0.22. This ester may be drawn into fibers and molded into shaped articles.

EXAMPLE 6

Polyester from oligomeric phenylene based thioether diol and terephthaloyl chloride Using the procedure described in Example 5, 25.03 grams of the oligomeric diol (hydroxyl equivalent of 0.883 milliequivalents per gram) prepared in Example 3 was reacted with 2.264 grams of terephthaloyl chloride and 2.347 grams of triethylamine dissolved in 125 ml. of dichloroethane. After recovery by coagulation, the dry polyester was obtained in a quantitative yield and at a reduced viscosity of about 0.3 when measured in chloroform as a 0.2% solution at 25° C.

EXAMPLE 7

Polyformal from oligomeric phenylene based thioether diol

Thirty grams (0.0131 mole) of the oligomeric diol prepared in Example 3 was reacted with 0.407 grams (0.0131 moles) of 96.6% formaldehyde and 0.020 grams of p-toluene sulfonic acid monohydrate in 30.0 ml. of dichloroethane at 60° C. for 1 hour, followed by azeotropic removal of water. The mixture was then cooled back to 60° C. and an additional 0.005 grams of formaldehyde was added and after heating at 60° C. for 45 minutes, the mixture was again heated to reflux to remove water azeotropically. This operation was repeated twice more. Thereafter, the mixture was neutralized with dilute ammonium hydroxide and the mixture coagulated in isopropanol. The polymer, obtained in quantitative yield had a reduced viscosity of 0.25 when measured in chloroform as a 0.2% solution at 25° C. This polyformal is believed to have the structure shown below:

IX

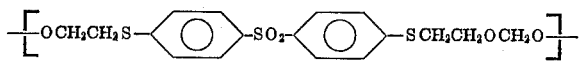

The above described polyformal can be used for the preparation of shaped articles and extruded forms.

EXAMPLE 8

When Example 1 is repeated with the exception that the dichlorodiphenyl sulfone is replaced by a molar equivalent of Aroclor 5460 (trademark of Monsanto Chemical Company for commercially available chlorinated terphenyl), a diol is obtained and believed to have the average formula given below:

X

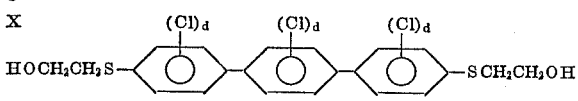

wherein $d$ is an integer having values of 1 to 4.

EXAMPLE 9

When Example 5 is repeated with the exception that the bis[4-γ-beta-hydroxyethylthio)phenylene]sulfone is replaced by Aroclor 5460, a polyester is obtained, believed to have the average formula shown below:

XI

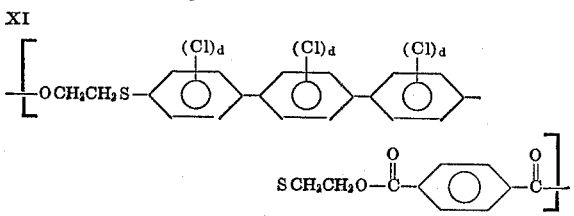

wherein $d$ is an integer having values of 1 to 4.

The polyester described in Example 9 may be drawn into fibers.

EXAMPLE 10

When Example 5 is repeated with the exception that the bis[4-(beta-hydroxyethylthio)phenylene]sulfone is replaced by hexachlorobenzene, the corresponding polyester is obtained, believed to have the formula:

XII

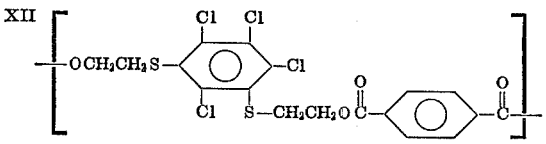

EXAMPLE 11

When Example 1 is repeated with the exception that beta-mercaptoethylamine is used in place of the beta-hydroxyethyl mercaptan, a bis[4-(beta-aminoethylthio)phenylene]sulfone is obtained having the formula:

XIII

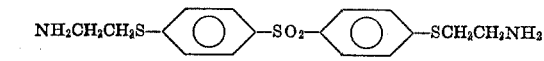

EXAMPLE 12

When Example 1 is repeated with the exception that beta-mercaptoethyl acetate is substituted for the beta-hydroxyethyl mercaptan, bis[4 - (beta - acetoethyl thio) phenylene]sulfone is obtained having the formula:

XIV
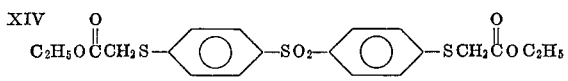

EXAMPLE 13

When Example 10 is repeated with the exception that beta-mercaptoethylamine is substituted for the beta-hydroxyethyl mercaptan a diamine having the following structure is obtained:

XV
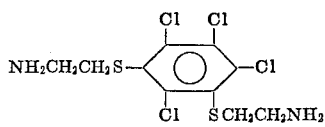

EXAMPLE 14

When Example 8 is repeated with the exception that beta-mercaptoethyl acetate is used in place of the beta-hydroxyethyl mercaptan, a diacetate believed to have the following structure is obtained:

XVI
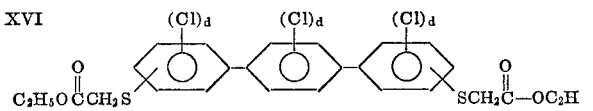

EXAMPLE 15

A polyester-styrene composite can be prepared as follows. To a 500 ml. three-necked flask equipped with a nitrogen sparger tube, vacuum take-off, stirrer thermometer and Dean-Stark moisture trap are charged 200.6 g. (0.54 moles) of bis[4-(beta-hydroxyethylthio)phenylene] sulfone, having a M.P. of about 124–125° C. and 39.75 g. (0.54 moles) of maleic anhydride. The mixture is heated to about 175° C. over a period of about 4 hours while distilling off water. At 175° C. the system is placed under vacuum and additional water is removed by distillation, for approximately fifteen minutes. A polyester having a molecular weight of about 2000 is thus obtained. A mixture of this polyester with styrene 30:70 by weight can be copolymerized by heating with about 1.5%, based on the total charge weight, of benzoyl peroxide at about 100° C. to afford a normally solid flame resistant copolymer suitable for the fabrication of shaped articles such as equipment housings.

EXAMPLE 16

Following the procedure described in Example 15 with an equivalent amount of bis(1,3-beta-hydroxyethylthio) tetrachlorobenzene, maleic anhydride and styrene also affords a normally solid polyester-styrene composite having enhanced flame resistant characteristics and also suitable for the fabrication of shaped articles.

The diamines available through this invention, such as that provided in Example 13, can be converted to polyamides by condensation polymerization with a dibasic acid, as for example terephthalic acid or the corresponding diacyl chloride. These polyamides can be drawn into fibers.

The diacetates available through this invention, such as that provided in Example 14, can be converted to polyesters by ester interchange with a glycol. These polyesters can be used to manufacture films and sheets.

Although the invention has been described in its preferred forms with a certain degree of particularity, it is understood that the present disclosure of the preferred forms has been made only by way of example and that numerous changes may be resorted to without departing from the spirit and scope of the invention.

What is claimed is:
1. Bisthioether having the formula:

wherein G is a divalent radical selected from the group consisting of (1)
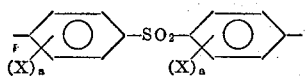

(2)
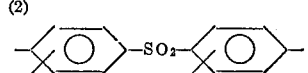

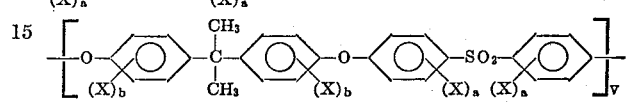

or (3)

wherein
R is an alkylene radical having 1 to about 10 carbon atoms;
$m$ and $d$ are integers having values of 1 to 4;
$a$ and $b$ are integers having values of 0 to 4;
$v$ is a rational number having values of 1 to about 25,
X is a halogen selected from the group consisting of Cl, Br and I, and Z is —OH.

2. Bisthioether claimed in claim 1 wherein G is:

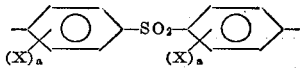

3. Bisthioether claimed in claim 1 wherein G is:

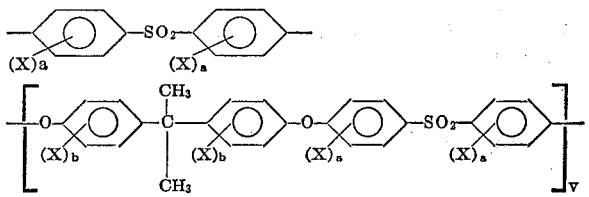

4. Bisthioether claimed in claim 1 wherein G is:

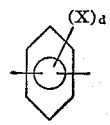

5. Bisthioether claimed in claim 2 wherein X is chlorine.
6. Bisthioether claimed in claim 3 wherein X is chlorine.
7. Bisthioether claimed in claim 4 wherein X is chlorine.
8. Bisthioether claimed in claim 7 wherein $m$ is 1 and $d$ is 4.
9. Bisthioether claimed in claim 7 wherein $m$ is 2.
10. Bisthioether claimed in claim 7 wherein $m$ is 3.

References Cited
UNITED STATES PATENTS

| | | | |
|---|---|---|---|
| 3,006,962 | 10/19/61 | Schultz | 260—607 A |
| 3,494,966 | 2/19/70 | Geering | 260—607 A |
| 2,926,158 | 2/19/60 | Martin | 260—79.3 M |

LEWIS GOTTS, Primary Examiner

R. D. PHILLIPS, Assistant Examiner

U.S. Cl. X.R.

260—793 M, 578, 470